United States Patent [19]
Zeller et al.

[11] Patent Number: 5,183,289
[45] Date of Patent: Feb. 2, 1993

[54] HOUSING FOR PROTECTIVE AIR BAR RETAINING SYSTEMS OF AUTOMOTIVE VEHICLES

[75] Inventors: Gregor Zeller; Konrad Randelzhofer, both of Aschaffenburg, Fed. Rep. of Germany

[73] Assignee: Petri, A.G., Aschaffenburg, Fed. Rep. of Germany

[21] Appl. No.: 711,527

[22] Filed: Jun. 10, 1991

[30] Foreign Application Priority Data

Jun. 9, 1990 [EP] European Pat. Off. ......... 90110963.7

[51] Int. Cl.⁵ ............................................. B60R 21/20
[52] U.S. Cl. ...................................... 280/743; 280/731
[58] Field of Search ................ 280/728, 731, 732, 743

[56] References Cited
U.S. PATENT DOCUMENTS

| | | | |
|---|---|---|---|
| 4,334,699 | 6/1982 | Patzelt et al. | 280/731 |
| 4,878,689 | 11/1989 | Mitzkus et al. | 280/731 |
| 5,056,814 | 10/1991 | Shiraki et al. | 280/731 |
| 5,069,477 | 12/1991 | Shiraki | 280/732 |

Primary Examiner—Kenneth R. Rice
Attorney, Agent, or Firm—Robert J. Koch

[57] ABSTRACT

An air bag housing for automotive vehicles is disclosed. The housing includes a pot-like generator carrier to hold the air bag, a cover cap surrounding the generator carrier and having a predetermined breaking line, and a safety plate to secure the cover cap against unauthorized removal. The cover cap includes a reinforcing insert having an interrupted portion in the area of the predetermined breaking line. The reinforcing insert includes an essentially rectangular reinforcing frame made of a dimensionally stable material with a high elastic modulus, such as a metal or plastic. The reinforcing insert may be provided with free cuts or cut-out portions simultaneously forming the predetermined breaking lines, so that two flap-like cover surfaces only connected along an essentially linear connecting line with the circumferential wall are formed. The reinforcing insert may be provided with openings along the connecting lines between the flap-like cover surfaces and the reinforcing frame. Openings may also be provided on the circumferential and cover surfaces. Free cuts or cut-out portions to block edge tearing, may extend from the ends of lateral free cuts in the direction of the connecting line, between the cover flaps and the reinforcing frame.

32 Claims, 3 Drawing Sheets

HOUSING FOR PROTECTIVE AIR BAR RETAINING SYSTEMS OF AUTOMOTIVE VEHICLES

BACKGROUND OF THE INVENTION

1. Field of the Invention

The invention relates to a housing for protective air bag retaining systems having an air bag receiving generator carrier, a cover cap surrounding the generator carrier, and a safety plate securing the cover cap against unauthorized removal.

2. Description of the Related Technology

In known housings cover caps are provided with a reinforcing insert of textile net fabric. Blanks for the cover cap are prepared and sewn to form flap-like cover surfaces. The flap-like cover surfaces are then sewn to a closed strip representing the lateral border walls of the cap. The strip forms the reinforced frame of the insert. To prepare the finished cover, the reinforcing insert is first placed into a mold. The freely projecting flap parts are stabilized by pins in a center plane of the encasing mold. Following the closing of the mold, the insert is subsequently encased in plastic. The production of the known cover caps is extraordinarily involved and leads to an unacceptably high rejection rate. A number of process steps, such as cutting the net fabric parts and the strip, sewing the strip to the closed reinforcing frame and sewing the net fabric parts, are required to produce the reinforcing insert. The process steps involved result in the high rejection rate. In addition, the exact positioning of the reinforcing insert in the center plane of the mold is rather difficult to achieve. On the one hand the reinforcing insert is flexible, and on the other, elastically rigid within a wide range, thus it is difficult to hold the reinforcing insert in this position during the entire injection molding process. It is necessary to maintain the positioning of the reinforcing insert because the cover cap is exposed to view in the automotive vehicle, i.e., no marks must be visible on the surface of the reinforcing insert. However, for technical and cost reasons the encasing cannot exceed a certain predetermined thickness. The observation of these conditions cannot be adequately assured in operation, so a high rejection rate must be expected in the production of cover caps. Another essential disadvantage of known housings is that unauthorized access to the operating parts of the protective air bag retaining systems housing cannot be prevented or satisfactorily documented with an adequate degree of safety. This disadvantage results from the lack of a joint, excluding unauthorized release, located between the cover cap and the generator carrier or a safety plate mounted on the generator carrier. The joint is omitted for both material technical and design reasons, In known installations the cover cap is clipped onto the generator carrier with a spring-groove connection. The cover cap is secured against the safety plate projecting upward into the cap by a simple, immediately accessible and releasable screw joint.

SUMMARY OF THE INVENTION

It is an object of the present invention to create an air bag housing that may be produced in a cost effective manner under adequately reproducible conditions, so that rejections are reduced to a minimum. This object may be attained with a housing having an air bag receiving generator carrier, a cover cap surrounding the generator carrier, and a safety plate securing the cover cap against unauthorized removal. The air bag housing may include a reinforcing insert. The reinforcing insert may include a plurality of cut-out portions. The cut-out portions define spaced-apart flaps of the reinforcing insert. The cut-out portions may be configured to prevent edge tearing or breaking of the flaps.

In an advantageous embodiment of the invention, a height limiting stop and reinforcing strip are provided.

The device according to the invention includes a housing, wherein the reinforcing insert for the cover cap of the housing may be produced with absolute dimensional stability, without affecting the operational requirements of a protective air bag impact device relative to a high tearing strength combined with high flexibility in the instant of maximum dynamic stress. The insert may be produced with minimum tolerances by punching and has absolute dimensional stability. The manufacture of the reinforcing insert according to the invention and its placement into the encasing mold is greatly simplified in comparison to known housing. Changes in the position of the reinforcing insert in the encasing mold under the pressure of the material injected into the mold is unavoidable during the production of cover caps for known installations. According to the invention, such position changes are largely if not absolutely excluded.

Further embodiments and advantages will become apparent from the following description of the preferred embodiment.

DETAILED DESCRIPTION OF THE PREFERRED EMBODIMENT

Figure 1:
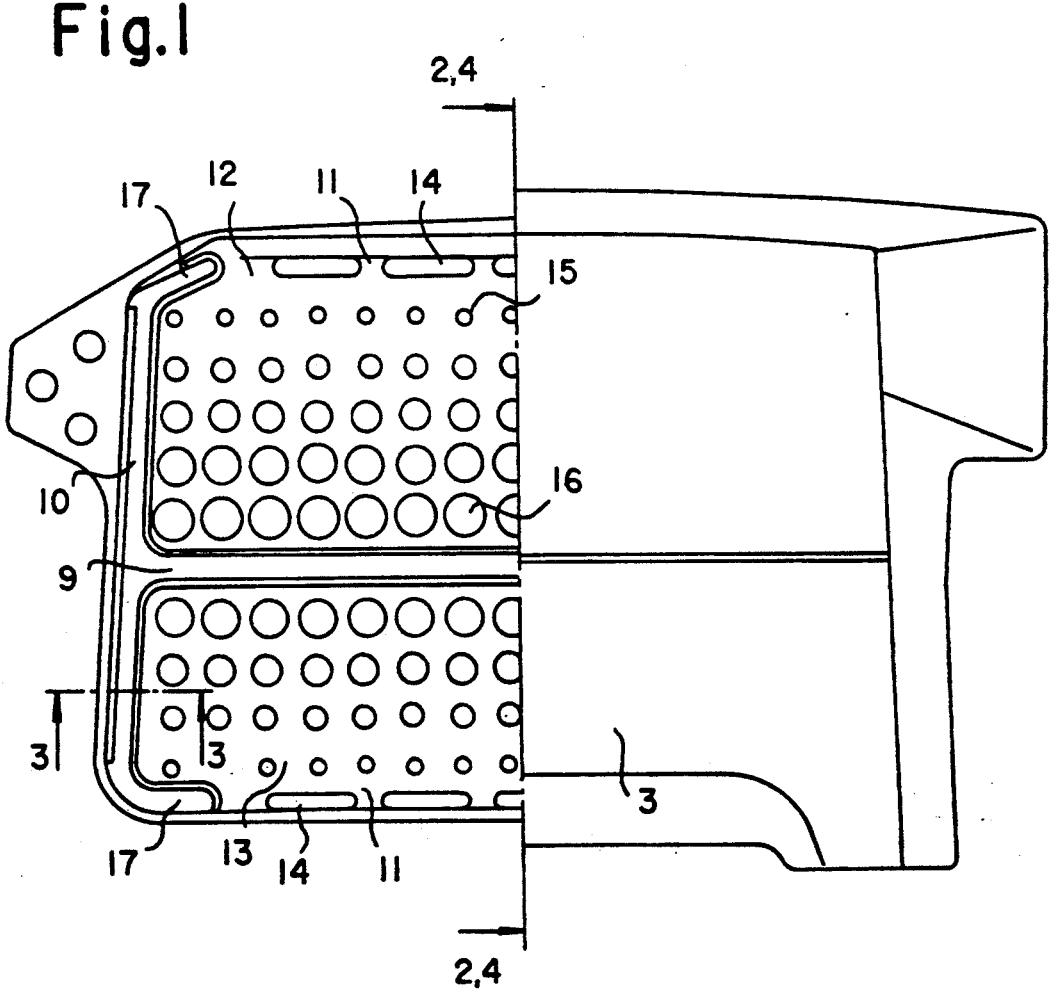
FIG. 1 shows a protective air bag impact device according to the invention with the encasing removed on one side.

A protective air bag impact device for automotive vehicles is shown in the drawings and includes a pot-like generator carrier 2 to contain the air bag 1 and to hold a gas generator and a cover cap 3. The cover cap surrounds generator carrier 2 and includes a predetermined breaking line. The housing further includes a reinforcing insert 4, which is interrupted in the area of the predetermined breaking line, and a safety plate 5 to secure cover cap 3 against unauthorized removal. Reinforcing insert 4 for the cover cap includes an essentially rectangular reinforcing frame 8 and is made of a dimensionally stable material with a high elastic modulus. Reinforcing insert 4 includes free cuts or cut-out portions 9, 10 simultaneously forming the predetermined breaking lines in such a manner that two flap-like cover surfaces 12, 13 are defined. The cover surfaces may be connected to a circumferential wall along an essentially linear connecting line 11 only. The free cuts are essentially T-shaped, with a center cut 9 extending between flaps 12, 13 and a lateral cut 10 extending between the side edges of flaps 12, 13 and reinforcing frame 8.

As shown in FIG. 1, an embodiment of the reinforcing insert is provided with openings 14, 15, 16 along connecting lines 11, between flap-like cover surfaces 12, 13 and reinforcing frame 8, and on the circumferential and cover surfaces 8, 12, 13. Openings 14 provided along connecting line 11 may be slots or elongated holes, while a plurality of round holes 15, 16 are located in the cover surfaces 12, 13. The round holes may be arranged in a regular manner in rows as shown in the present example and having a total cross section increasing in the direction of free cut 9 extending between the cover surfaces. In this sense, holes 15 have a smaller cross section than holes 16.

Figure 3:
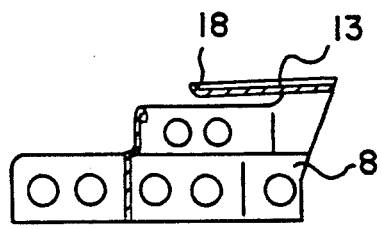
FIG. 3 shows a section view of the invention taken along on the line A—A in FIG. 1.
Figure 4:
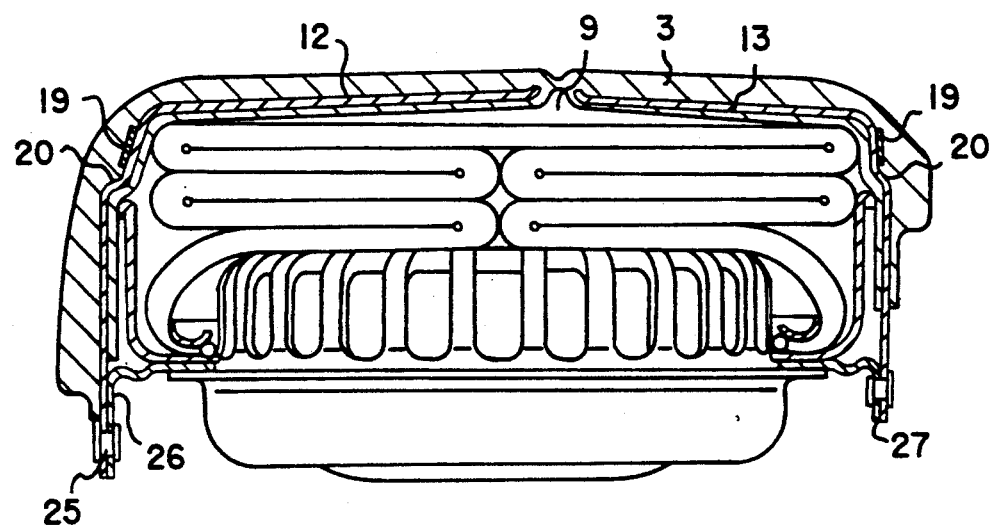
FIG. 4 shows a section view corresponding to FIG. 2 through another embodiment of a protective air bag impact device.

The reinforcing insert is further provided with free cuts or cut-out portions 17 to block edge tearing. Free cuts 17 extends from the ends of lateral free cuts 10 in the direction of connecting line 11 between cover flaps 12, 13 and reinforcing frame 8. These free cuts allow the high tearing force appearing upon the actuation of the device to be transmitted softly into the reinforcing frame, thereby preventing the edge tearing or breaking of the cover flaps. As further seen in FIG. 3, flap-like cover surface 13 is provided at its free edge toward the free cut with a beaded edge 18 to stiffen it. The circumferential wall may also be provided with corresponding beaded edges. As shown in FIG. 4, it is further possible to apply a high strength, elastic reinforcing strip 19 to height limit stop 20 of the insert.

Figure 6:
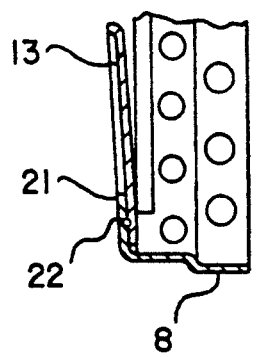
FIG. 6 shows a section view through the protective air bag impact device taken along line C—C in FIG. 5.
Figure 5:
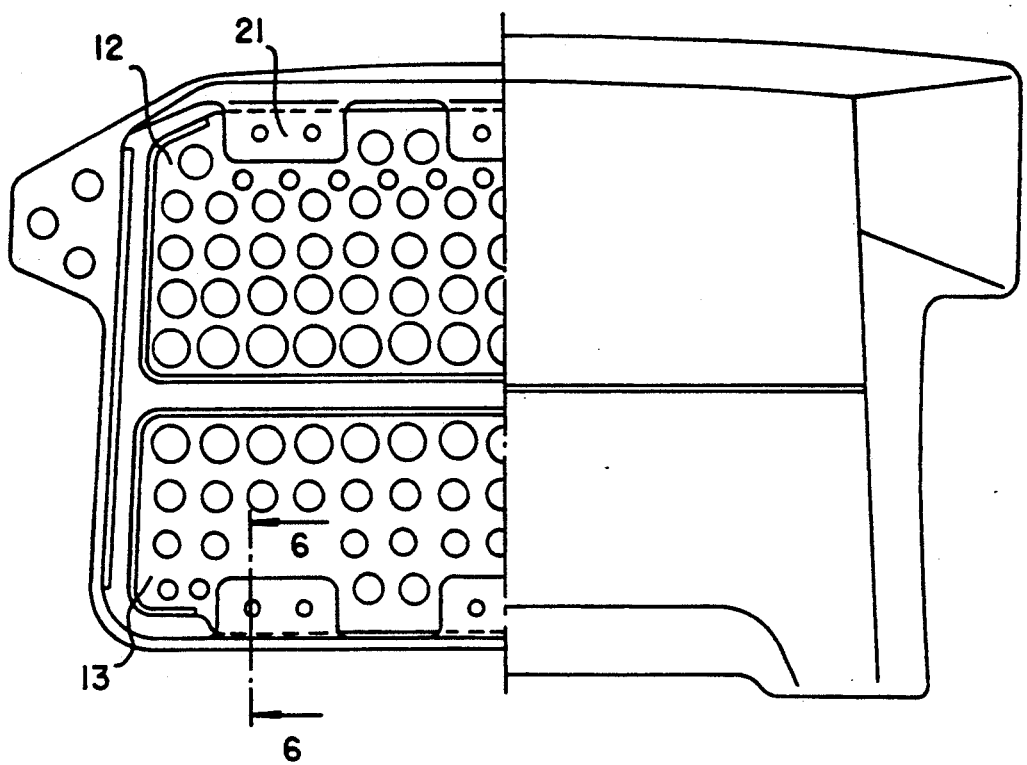
FIG. 5 shows a view corresponding to FIG. 1 of another embodiment of a protective air bag impact device.

In the embodiments show in FIG. 1 to 4, the reinforcing insert is made in a single piece, with the cut-out portions or free cuts applied by punching. It is, however, also possible to produce the reinforcing frame and flap-like cover surfaces 12, 13 as individual parts, in the manner shown in FIG. 5 to 7. One of the parts may be equipped with a connecting strap 21, whereby the parts are connected with each other frictionally, positively or with a material joint. In the embodiment shown in FIG. 5 and 6, a material joint of spot weld 22 is formed by spot welding cover flaps 12, 13 to connecting straps 21. For this purpose the connecting straps advantageously include a material with a low yield point and high plastic deformability and have a hinge action. The cover flaps may advantageously include a highly flexible material with a high recovery force, for example, spring steel.

Figure 7:
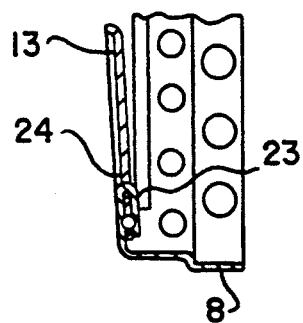
FIG. 7 shows a section view corresponding to FIG. 6 through another embodiment of a protective air bag impact device.

In contrast, FIG. 7 shows a frictional connection between a cover surface and the reinforcing frame. Cranked or bent tongues 23 may be provided on the reinforcing frame 8 to frictionally engage correspondingly shaped slots 24 of the flap-like cover surfaces.

Figure 2:
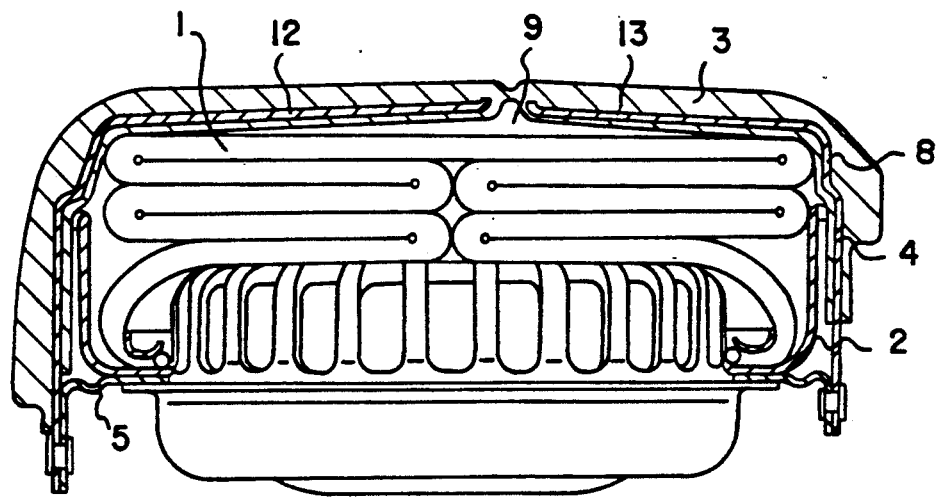
FIG. 2 shows a section view through the protective air bag impact device taken along line B—B in FIG. 1.

Finally, it can be clearly seen from FIG. 1, 2 and 4 that the functional parts, in particular the air bag itself, may be secured with absolute safety against unauthorized access. For this purpose, safety plate 5 includes a leg 26 extending in the downward direction and is mounted against generator carrier 2. Further, the reinforcing insert of the cover cap and the safety plate may be extended so that their free ends are abutting flat against each other. The overlapping end is thus accessible from either side, so that a nonreleasable connection or joint 27 may be applied, i.e., the parts may be connected by welding or rivets 25.

The illustrated embodiments are shown by way of example. The spirit and scope of the invention is not to be restricted by the preferred embodiment shown.

We claim:

1. An air bag housing comprising:
   an air bag receiving generator carrier;
   a cover cap surrounding said generator carrier and exhibiting a predetermined breaking line, said cover cap including a reinforcing insert exhibiting a contour roughly corresponding to an area of said predetermined breaking line, said reinforcing insert configured with a plurality of flaps, said reinforcing insert further exhibiting a circumferential wall located proximal to said flaps, each of said flaps is connected along a substantially linear connecting line to said reinforcing insert along said circumferential wall; and
   a safety plate connected to said cover cap.

2. An air bag housing according to claim 1, wherein a contour of said reinforcing insert flaps defines cut-out portions in a substantially T-shape, a center cut-out portion extending between said flaps and a lateral cut-out portion extending between lateral edges of said flaps and said circumferential wall.

3. An air bag housing according to claim 1, wherein: said reinforcing insert exhibits first openings located along the connecting lines and second openings located on said flaps and said circumferential wall.

4. An air bag housing according to claim 3, wherein said first openings located along the connecting line are slots.

5. An air bag housing according to claim 3, wherein said flap exhibits a plurality of intermittently arranged second openings.

6. An air bag housing according to claim 1, wherein a contour of said reinforcing insert is configured to define tear-inhibiting cut-out portions.

7. An air bag housing according to claim 1, wherein said flaps exhibit stiffening members located along free edges of said flaps toward said cut-out portions.

8. An air bag according to claim 7, wherein said flaps exhibit a beaded edge located along free edges of said flaps toward said cut-out portions.

9. An air bag housing according to claim 1, wherein said reinforcing insert further comprises a reinforcing strip.

10. An air bag housing according to claim 1, wherein said reinforcing insert is a single-piece reinforcing insert.

11. An air bag housing according to claim 1, wherein said reinforcing insert and said flaps are made in several parts.

12. An air bag housing according to claim 10, wherein said reinforcing frame and said flaps are made from different materials.

13. An air bag housing according to claim 11, further comprising bent tongues located on said reinforcing frame.

14. An air bag housing according to claim 10, wherein said safety plate is fastened to said generator carrier and exhibits at least one leg, said cover cap and said leg abut flat against each other and form a nonreleasable connection.

15. An air bag housing according to claim 1, wherein said reinforcing insert is a substantially rectangular reinforcing frame formed from a dimensionally stable material with a high elastic modulus.

16. An air bag housing according to claim 15, wherein said dimensionally stable material includes a metal.

17. An air bag housing according to claim 15, wherein said dimensionally stable material includes a plastic material.

18. An air bag housing according to claim 3, wherein said openings located along the connecting line are elongated holes.

19. An air bag housing according to claim 3, wherein said flap defines a plurality of second openings regularly arranged in rows.

20. An air bag housing according to claim 3, wherein said second openings defined in said flap are configured to have an increasing total cross section in the direction of a center cut-out portion.

21. An air bag housing according to claim 6, wherein said reinforcing insert exhibits a reinforcing frame, said tear-inhibiting cut-out portions are configured to extend in the direction of the connecting line between said flaps and said reinforcing frame.

22. An air bag housing according to claim 15, wherein said reinforcing frame exhibits a stiffening member along the free edge of said reinforcing frame toward said cut-out portions.

23. An air bag housing according to claim 1, wherein said cut-out portions comprise punched cut-out portions.

24. An air bag housing according to claim 11 further comprising a connecting strap connecting said reinforcing frame to one of said flaps.

25. An air bag housing according to claim 11, wherein said reinforcing frame and said flaps are frictionally connected.

26. An air bag housing according to claim 11, wherein said reinforcing frame and said flaps are positively connected.

27. An air bag housing according to claim 11, wherein said reinforcing frame and said flaps are configured to be connected by a material joint.

28. An air bag housing according to claim 12, wherein said reinforcing frame is made from a highly flexible material with a high recovery force.

29. An air bag housing according to claim 12, wherein said reinforcing frame is made from spring steel.

30. An air bag housing according to claim 12 further comprising a connecting lash configured to have a hinge action and connecting one of said flaps to said circumferential wall.

31. An air bag housing according to claim 13, wherein said bent tongues are configured to provide a hinged positive connection with said flaps.

32. An air bag housing according to claim 13, wherein said flaps exhibit tongue-receiving slots configured to corresponding to and frictionally engaging said bent tongues.

* * * * *